United States Patent [19]

Wilaman

[11] 3,741,587
[45] June 26, 1973

[54] TRAILER HITCH
[76] Inventor: Ernest R. Wilaman, 1746 Larchmont Drive, Warren, Ohio 44483
[22] Filed: Apr. 26, 1971
[21] Appl. No.: 137,259

[52] U.S. Cl. ......... 280/406 A, 280/446 B, 280/489, 280/494
[51] Int. Cl. ............................................. B62d 53/00
[58] Field of Search ............... 280/406, 446 B, 489, 280/492, 494

[56] References Cited
UNITED STATES PATENTS

| | | | |
|---|---|---|---|
| 3,342,509 | 9/1967 | Sancioni | 280/489 |
| 2,447,250 | 8/1948 | Holloway | 280/494 |
| 2,773,704 | 12/1956 | Saxon | 280/489 |
| 3,400,948 | 9/1968 | Matson | 280/406 A |
| 3,519,287 | 7/1970 | Pontbriand | 280/446 B |
| 3,601,427 | 8/1971 | Holt | 20/406 A |
| 3,239,242 | 3/1966 | Adams | 280/489 |

Primary Examiner—Leo Friaglia
Attorney—Peter L. Klempay

[57] ABSTRACT

A hitch assembly for connecting a trailer vehicle to tractor vehicle. A draw bar is securely attached to the tractor vehicle frame and projects rearwardly from the vehicle. The rear end of this bar is connected to a coupling member by a vertical pin. The coupling member is also connected to the trailer vehicle tongue by a horizontally extending pin. Movement about the horizontal pin is limited by a restraining bar connected to the trailer vehicle tongue and extending above the coupling member where it is confined within a yoke carried by the coupling member.

16 Claims, 11 Drawing Figures

INVENTOR.
ERNEST R. WILLAMAN

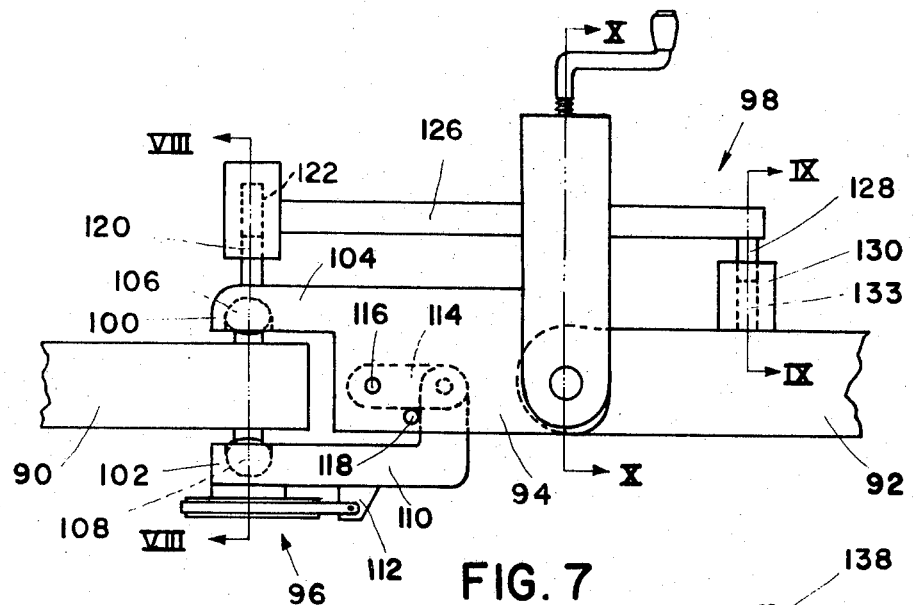
FIG. 7
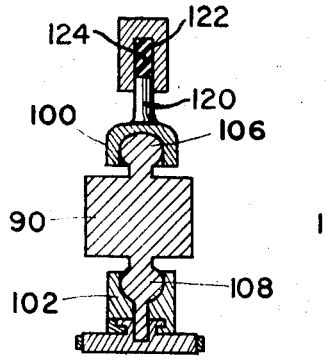
FIG. 8
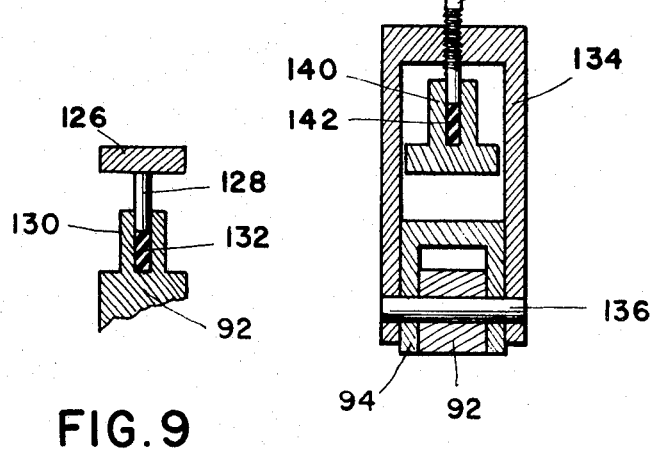
FIG. 9
FIG. 10
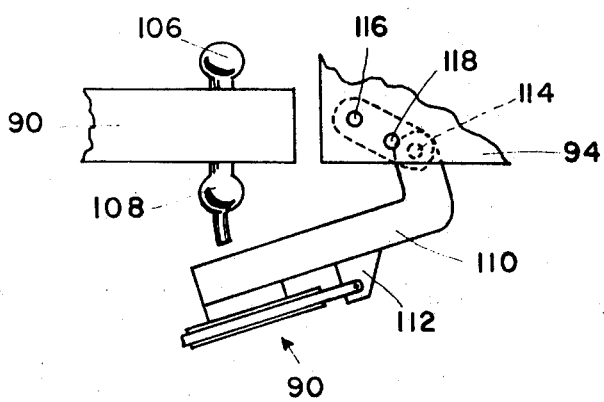
FIG. 11
INVENTOR.
ERNEST R. WILLAMAN
BY
Peter L. Klempay
AGENT

TRAILER HITCH

The present invention relates to a trailer hitch assembly and more particularly to an improved hitch assembly which distributes the tongue weight between the tractor and trailer vehicles and includes means to effectively and safety limit the vertical pivotal movement of the trailer vehicle tongue.

Many types of hitch assemblies for connecting a tractor vehicle such as an automobile to a trailer vehicle such as a boat trailer, camper, or small house trailer, have been proposed. The most common of these hitch assemblies is the so called ball hitch which consists of a generally spherical ball mounted at the rear end of a draw bar which is connected to the tractor vehicle frame and a cup-like coupling member connected to the forward end of the trailer vehicle tongue. The cup-like coupling member is retained on the ball by a suitable latch or restraining plate. With such a hitch assembly the axes of both horizontal and vertical pivotal movement of the trailer vehicle frame relative to the tractor vehicle frame are coincident with the center of the spherical ball.

In order to control lateral swaying and vertical bobbing or undulating movement of the trailer vehicle so that the driver's control of the vehicle is not adversely affected various auxiliary devices have been proposed for restraining or dampening such undesirable motions. The devices heretofore proposed providing such controlling action have generally been of complex and expensive construction. Many of these devices are also separate units from the hitch assembly itself. With such devices the hitching or unhitching of the trailer vehicle from the tractor vehicle is a complicated and time consuming operation.

The devices heretofore available for controlling and restraining undulating movement between the tractor and trailer vehicles employ spring members to achieve the desired control. One widely used device employs a spring steel bar extending rearwardly below the hitch assembly, secured at its forward end to the tractor vehicle draw bar and connected by a chain at its rear end to the trailer vehicle tongue. While such devices do limit the range of vertical pivoting movement about the hitch, the recoil action of the spring results in an undesirable oscillating action.

It is the primary object of the present invention to provide a trailer hitch assembly which permits easy, rapid hitching and unhitching of the trailer vehicle to the tractor vehicle and which incorporates means for restraining trailer vehicle induced motion.

A further object of the invention is the provision of a trailer hitch assembly which eliminates the need for auxiliary motion restraining or dampening devices.

Yet a further object of the invention is the provision of a trailer hitch assembly in which the axes of horizontal and vertical pivotal movement of the trailer vehicle frame relative to the tractor vehicle frame are separated from one another.

It is also an object of the present invention to provide a trailer hitch assembly which incorporates means for limiting vertical pivotal movement between the tractor and trailer vehicles without the rapid recoil action and undesirable oscillating movement.

Another object of the invention is the provision of a trailer hitch assembly which provides substantially increased resistance, when compared to that of existing hitch assemblies, of the trailer vehicle to roll over, the resistance to roll-over increasing as the tractor and trailer vehicles assume a greater angle to one another about the vertical axis of the hitch assembly.

Another object of the invention is the provision of a trailer hitch assembly which is of simple and economical construction.

The above and other objects of the invention which will become apparent in the following detailed description are achieved by providing a trailer hitch assembly which comprises a coupling member which is removeably connected to the tractor vehicle draw-bar by a vertical pin at its forward end and to the trailer vehicle tongue by a horizontal pin at its rear end. A friction brake assembly may be provided to control or dampen lateral movement or pivotal movement about the vertical pin. Vertical movement is restrained by a bar and yoke assembly.

For a more complete understanding of the invention and of the objects and advantages thereof reference should be had to the following detailed description and the accompanying drawings wherein there is shown a preferred embodiment of the invention.

Figure 1:
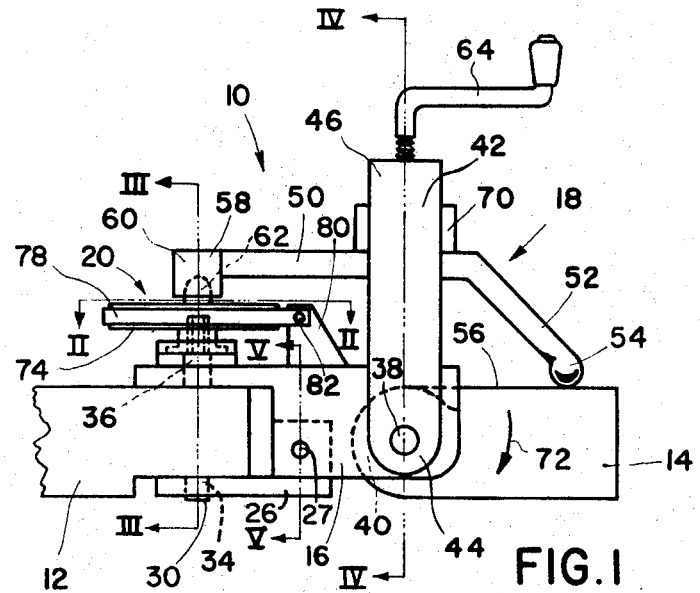
FIG. 1 is a side elevational view of the trailer hitch of the present invention.
Figure 2:
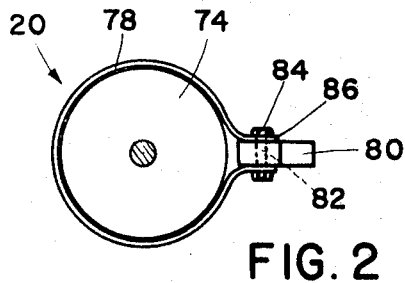
FIG. 2 is a fragmentary transverse sectional view taken along the line II—II of FIG. 1.
Figure 4:
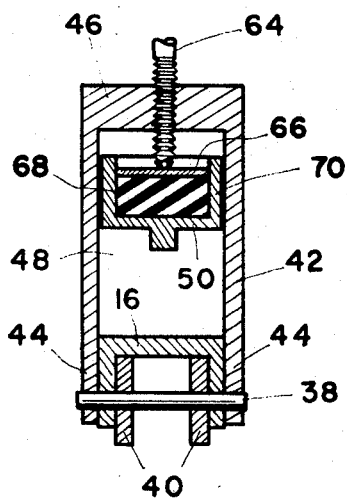
Figures 3, 5:
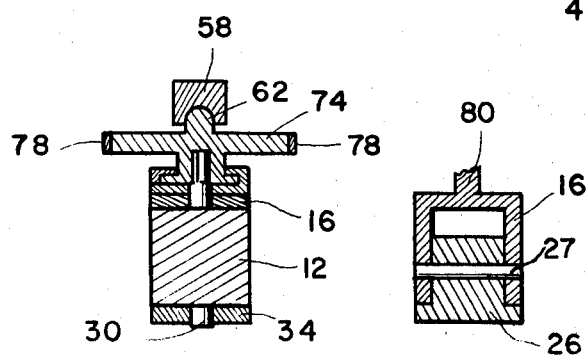
Figure 6:
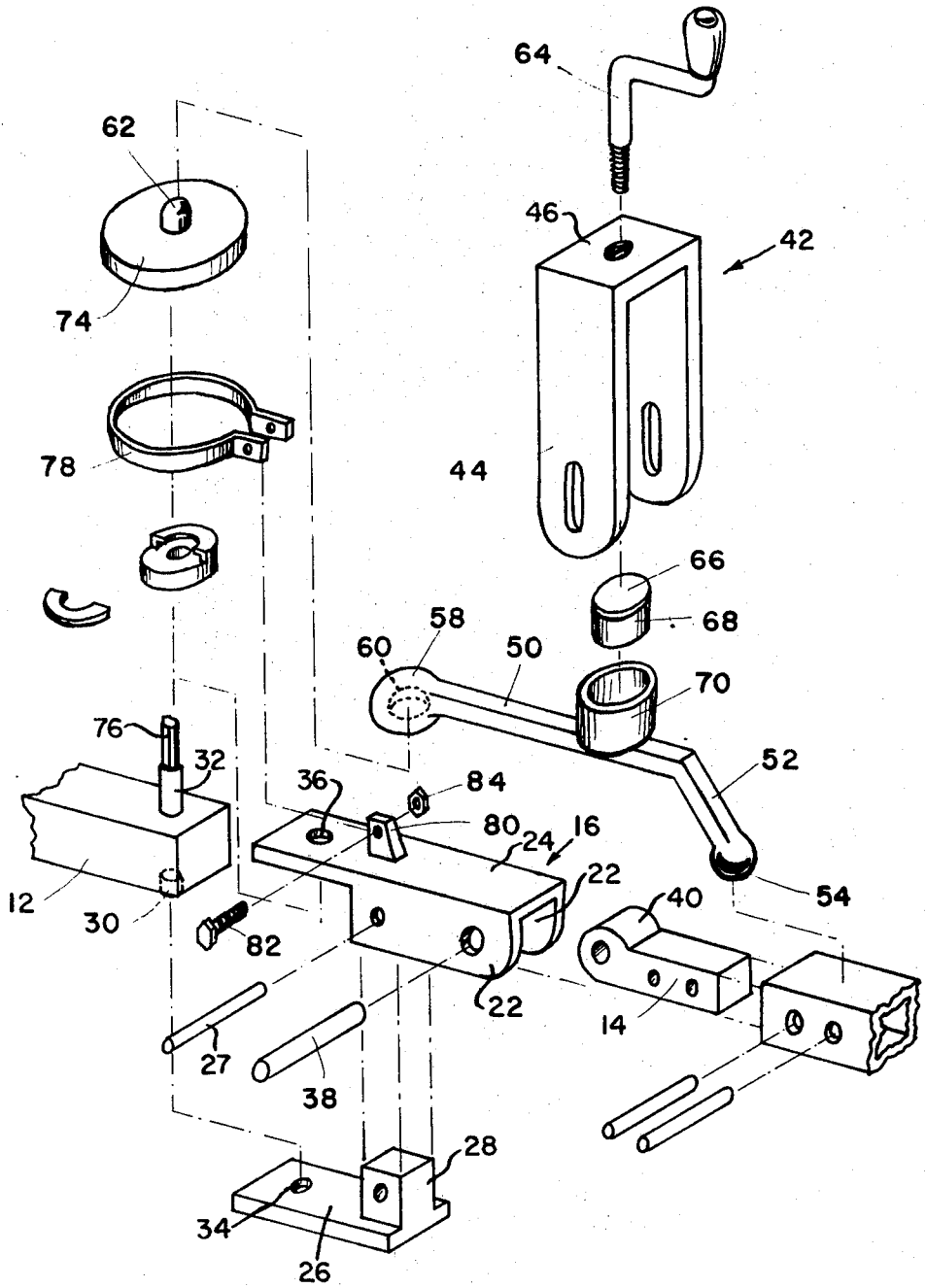

FIGS. 3, 4, and 5 are fragmentary vertical sectional views taken along the lines III—III, IV—IV, and V—V, respectively of FIG. 1;

FIG. 6 is an exploded isometric view of the hitch of FIG. 1;

FIG. 7 is a side elevational view of a second embodiment of the present invention;

FIGS. 8-10 are sectional views taken along the lines VIII—VIII to X—X, respectively, of FIG. 7; and FIG. 11 is a fragmentary side elevational view, partially in section, showing the relationship between the lower ball and cup assembly of the hitch of FIG. 7.

Referring first to FIGS. 1-6, a first embodiment of my invention will now be described. The trailer hitch, designated generally by the reference numeral 10, is designed to connect the rearwardly projecting drawbar 12 of a tractor vehicle such as an automobile, to the forward end of a trailer vehicle tongue 14. The hitch 10 consists essentially of a coupling member 16 connected to the tractor vehicle drawbar 12 and the trailer vehicle tongue 14, a vertical motion restraining assembly 18, and a horizontal motion restraining or dampening assembly 20.

The coupling member 16 consists of a pair of vertically extending side members 22, a horizontally extending plate-like top member 24 which is rigidly secured to each of the side members 22 and a lower horizontally extending member 26. The bottom horizontal plate-like member 26 is removably connected to the coupling member 16 by means of a pin 27 extending through the side members 22 and through a block or lug 28 which is welded or otherwise integrally formed with the plate-like bottom member 26 and which projects upwardly between the vertical plate members 22. As will be seen from FIG. 1, the forward ends of the upper horizontal member 24 and the lower horizontal member 26 form a bifrucated end for the coupling member 16 and the rear portion of the tractor vehicle drawbar 12 is received between these horizontal members. The drawbar 12 is provided, at its rear end, with aligned vertically extending pins 30 and 32 on its lower and upper surfaces, respectively, and these pins are received in holes 34 and 36 in the lower and upper plate members 26 and 24, respectively. It will be understood that at least the portions of the pins 30 and 32 which are received within the holes 34 and 36 are round so that rotation of the coupling member 16 about the axis of the pins 30 and 32 is possible. Preferably, the separation between the upper and lower horizontal plates 24 and 26 of the coupling members 16 is substantially equal to the thickness of the rear portion of the drawbar 12 so that little vertical movement is permitted between the drawbar 12 and coupling member 16. Thus, the coupling member 16 is free to move only in a horizontal plane of the drawbar 12.

At the rear end of the coupling member 16 there is provided a horizontally extending pin 38. Journaled on this pin is the forward end 40 of the trailer vehicle tongue 14. This forward end 40 of the tongue 14 may consist of a solid member received between the side plates 22 of the coupling member or may consist of a pair of spaced vertically extending plates received either inside or externally of the coupling member side plates 22. In either event, the forward end 40 of the tongue 14 is connected to the coupling member 16 by the pin 38 so that movement of the tongue relative to the coupling member is possible only in the vertical plane of the coupling member.

The vertical motion restraining assembly 18 is illustrated clearly in FIGS. 1 and 4. This mechanism limits or restrains the degree of pivotal motion about the axis of the pin 38. A yoke 42 having downwardly extending leg portions 44 and a top portion 46 is pivotally connected at the lower end of the legs 44 to the coupling members 16 by the pin 38. The yoke 42 extends upwardly from the coupling member 16, defining an opening 48. A lever arm 50 extends through the opening 48. The principal portion of the lever arm 50 extends parallel to the coupling member 16 while the rear end portion 52 of the arm is angled downwardly, terminating in a ball-like end 54 which rests on the upper surface 56 of the trailer vehicle tongue 14. The forward end 58 of the lever arm 50 has a bore 60 extending vertically upward from its lower surface. A vertical pin 62, axially aligned with the pins 32 and 34 of the drawbar 12 is received in the bore 60. The portion of the arm 50 which passes through the opening 48 defined by the yoke 42 is of substantially the same width as is the opening 48. Thus, the lever arm 50 is held in vertical alignment with the coupling member 16 and the trailer vehicle tongue 14.

Mounted on the lever arm 50 where this arm passes through the yoke 46 is a retainer 70 which mounts a thick rubber pad 68. A screw 64 is threaded through the upper portion 46 of the yoke 42 and contacts a bearing plate 66 on the top of the rubber pad 68. The screw may be provided with a crank handle as shown to permit easy adjusting of the screw.

As the trailer vehicle tongue 14 pivots about the horizontal pin 38 in the direction of the arrows 72, the lever arm 50 which follows the upper surface 56 of the trailer vehicle tongue 14 moves downwardly in the opening 48 of the yoke 42. When the trailer vehicle tongue 14 pivots about the pin 38 in the direction opposite to that of the arrow 72 the arm 50 moves upwardly in the opening 48 of the yoke 42. This upward movement is limited, however, by the lower end of the screw 64 which contacts the bearing plate 66. The rubber pad 68 serves to dampen the upward movement of the arm 50 and hence the pivotal movement of the trailer vehicle tongue 14 about the pin 38. The pad 68 is preferably several inches thick so that sufficient rubber is provided to absorb substantial shocks. Unlike a spring assembly which immediately recoils upon the absorption of a shock, the rubber pad does not produce a large recoil force. As a result, the shock force is absorbed and dissipated without the undesirable oscillations which are produced by a spring arrangement. By adjustment of the screw 64 the range of movement of the trailer vehicle tongue 14 about the pin 38 may be regulated.

The mechanism 20 serves to control the pivotal action of the trailer about the vertical pins 32 and 34 of the tractor vehicle drawbar 12. This mechanism consists of a thick disc 74 which is keyed to a shaft 76 with the shaft 76 being also keyed to the upper end of the pin 32 so that the shaft 76 and disc 74 are stationary relative to the pin 32 and, hence, to the tractor vehicle drawbar 12. Surrounding the periphery of the disc 74 is a band type brake 78 which is anchored at its ends to an upwardly projecting bracket 80 rigidly affixed to the coupling member 16. The brake band 78 is attached to the bracket 80 by means of a nut and bolt combination 82 and 84. When the trailer vehicle pivots about the axis of the pins 32 and 34 relative pivotal motion occurs between the disc 74 and the brake band 78. In slow speed pivoting about the pins 32 and 34, such as occurs in the normal turning action of the tractor and trailer vehicles, the band 78 exerts only a small amount of braking torque on the disc 74. However, if the rate of rotation increases the torque exerted also increases and serves to restrain the rotating motion. In order to adjust the clearance between the discs 74 and the brake band 78, washers or shims may be provided between the ends of the band 78 and the bracket 80. Thus, as the band 78 becomes worn through use shims are removed from between the ends of the band and the bracket 78 so that substantially constant clearance can be maintained between the band and the disc 74. Preferably, this clearance is maintained so that there is little restraint of normal turning action but sufficient dampening occurs to retard any rapid turning action of the trailer vehicle relative to the tractor vehicle.

The embodiment of the invention shown in FIGS. 7–11 is of the same general construction as the previously described embodiment but incorporated various modifications. Thus, there is again provided a rearwardly projecting drawbar 90 which is secured to the frame of the tractor vehicle, a tongue 92 attached to the frame of the trailer vehicle, and a coupling member 94 joining the drawbar 90 to the trailer tongue 92 with the connection between the drawbar 90 and coupling member 94 permitting pivotal movement about a vertical axis while the connection between the coupling member 94 and the trailer tongue 92 permits pivotal movement about a horizontal axis. A friction brake arrangement 96 may again be provided to control or restrain the pivotal motion between the drawbar 90 and coupling member 94. The pivotal motion about the horizontal axis between the coupling member 94 and trailer tongue 92 is again limited by a yoke and bar assembly 98.

Conventional trailer hitch balls 106 and 108 are provided on the upper and lower surfaces, respectively, of the drawbar 90 with the balls vertically aligned with one another. The coupling member 94 has an upwardly forwardly projecting portion 104 which is provided with a cup-like socket 100 for mating with the upper ball 106. The lower ball 108 is received in a second retaining socket 102. This second socket 102 has a rearwardly projecting portion 110 which terminates in an upwardly projecting lug 112. The upper end of the lug 112 is pivotally connected to the rear end of a toggle link 114 which, in turn, is pivotally connected at its forward end to the coupling member 94 by a pin 116. A removable pin 118 passing through the coupling member 94 normally holds the toggle link 114 in a horizontal position to maintain the lower socket 102 in operative engagement with the lower ball 108. As will be seen from FIG. 11, when the pin 118 is withdrawn the linkage arrangement permits the lower socket member 108 to move downwardly and forwardly. This arrangement eliminates the necessity for precisely aligning the drawbar 90 and the coupling member 94 when connecting these members together. Since two balls are provided, pivot motion between the drawbar 90 and coupling member 94 is still limited to the common vertical axis of the balls 106 and 108.

Attached to and projecting upwardly from the ball 106 is a cylindrical member 120. This rod-like projection 120 extends through the upper forward portion 104 of the coupling member 94 and is received in a socket 122 at the forward end of the vertical motion restraining bar 126. The projection 120 extends only partially into the socket 122 with the remainder of the socket being filled with a compressable material 124 which may, for example, be rubber. The rear end of the bar 126 terminates in a downwardly extending portion 128, generally perpendicular to the upper surface of the trailer vehicle tongue 92. The rear end portion 128 of the bar 126 is received in a socket 130 carried on the trailer vehicle tongue 92. Again a pad of compressable material 132 is provided within the socket 130. The yoke 134 is again pivotally connected to the pin 136 joining the coupling member 94 to the trailer vehicle tongue 92. The lower end of the screw 138 carried by the yoke 134 terminates in a socket 140 carried by the bar 126. A compressable material 142 is also provided in this socket. With this arrangement, all the points of contact between the vertical motion limiting bar 126 and the hitch assembly are through compressable pads. This arrangement provides for improved damping action when any sudden pivoting about the pin 136 occurs.

It will be understood that while only the best known embodiments of the invention have been described and illustrated in detail, the invention is not so limited and that various changes and additions may be made to the described embodiments. Reference should therefore be had to the appended claims in determining the true scope of the invention.

I claim:
1. A hitch assembly for interconnecting tractor and trailer vehicles, comprising:
  a drawbar adapted to project rearwardly from the tractor vehicle;
  a coupling member connected to the drawbar for pivotal movement about a vertical axis;
  a tongue member adapted to project forwardly from the trailer vehicle, the tongue member being pivotally connected to the coupling member about a horizontal axis offset rearwardly from the vertical axis;
  a rigid lever arm extending across the horizontal axis in a plane perpendicular thereto and having front and rear portions which bear on the coupling member and the tongue member on opposite sides of the horizontal axis, respectively;
  means engaging the lever arm to maintain the arm in generally parallel relation to the coupling member; and
  resilient means engaging the lever arm to damper movement of the tongue member relative to the coupling member.

2. A hitch assembly for interconnecting tractor and trailer vehicles, comprising:
  a drawbar adapted to project rearwardly from the tractor vehicle;
  a coupling member pivotally connected to the drawbar for pivotal movement about a vertical axis;
  a tongue member adapted to project forwardly from the trailer vehicle, the tongue member being pivotally connected to the coupling member about a horizontal axis offset rearwardly from the vertical axis;
  a yoke projecting above the coupling member and having its leg portions pivotally connected thereto; and
  an arm extending parallel to and above the coupling member, the forward end of the arm bearing on the coupling member in axial alignment with the vertical axis, the arm projecting through the yoke, and the rear portion of the arm bearing on the top surface of the tongue member.

3. A hitch assembly according to claim 2 wherein the yoke is provided with an adjustable stop to limit upward movement of the arm within the yoke.

4. A hitch assembly according to claim 3 further including a pad of a compressable material between the arm and the adjustable stop of the yoke.

5. A hitch assembly according to claim 2 further including a pad of compressable material between the forward end of the arm and the coupling member.

6. A hitch assembly according to claim 2 further including a pad of a compressable material between the rear portion of the arm and the top surface of the tongue member.

7. A hitch assembly according to claim 1 further including means to restrain pivotal motion about the vertical axis.

8. A hitch assembly according to claim 7 wherein the means to restrain comprises a disc in axial alignment with the vertical axis and fixed against rotation relative to the drawbar, and brake means carried by the coupling member and frictionally engaging the disc.

9. A hitch assembly for interconnecting tractor and trailer vehicles, comprising:
  a drawbar adapted to project rearwardly from the tractor vehicle;
  a coupling member pivotally connected to the drawbar for pivotal movement about a vertical axis;
  a tongue member adapted to project forwardly from the trailer vehicle, the tongue member being pivotally connected to the coupling member about a horizontal axis offset rearwardly from the vertical axis;

a disc carried in axial alignment with the vertical axis and fixed against rotation relative to the drawbar; and brake means comprising a brake band encircling the circumferential periphery of the disc, the ends of the band being affixed to the coupling member.

10. A trailer hitch assembly, comprising:

a drawbar adapted to be connected to a tractor vehicle and to project rearwardly therefrom, the drawbar being provided with projecting portions on its upper and lower surfaces defining a vertical axis;

a tongue member adapted to be connected to a trailer vehicle and to project forwardly therefrom; and a coupling member having an upper forwardly projecting portion engaging the upper projecting portion of the drawbar and a lower forwardly projecting portion engaging the lower projecting portion of the drawbar, the lower projecting portion of the coupling member being movable relative to the upper projecting portion of the coupling member to permit engagement and disengagement of the coupling member to the drawbar, the rear end of the coupling member being connected to the tongue member for pivotal movement about a horizontal axis.

11. The trailer hitch assembly according to claim 10 wherein the lower forwardly projecting portion of the coupling member comprises a coupling element having means at its first end for engaging the lower projecting portion of the drawbar, a toggle linkage connecting the coupling element to the coupling member, and means for releasably locking the toggle linkage whereby the coupling element is retaining in engagement with the lower projecting portion of the drawbar.

12. A trailer hitch assembly, comprising:

a drawbar adapted to be connected to a tractor vehicle and to project rearwardly therefrom;

a tongue member adapted to be connected to a trailer vehicle and to project forwardly therefrom;

a coupling member connected at its forward end to the drawbar for pivotal motion about a vertical axis and at its rear end to the tongue member for pivotal motion about a horizontal axis;

a bifrucated member having the lower ends of its leg portions pivotally connected to the coupling member and extending above the coupling member;

an arm extending in a substantially parallel, spaced relation to the coupling member and passing between the legs of the bifrucated member, the forward end of the arm terminating in a downwardly extending portion aligned with the vertical axis;

a first impact absorbing member between the end of the downwardly extending portion and the forward end of the coupling member, the rear end of the arm terminating in a downwardly extending portion above the tongue member;

a second impact absorbing member between the end of the rear downwardly extending portion and the tongue member; and a third impact absorbing member between the arm and the upper end of the bifrucated member.

13. The trailer hitch assembly according to claim 12 wherein the impact absorbing members each comprise a compressable rubber pad of substantial thickness and a retaining member surrounding the sides of the pad.

14. The trailer hitch assembly according to claim 12 further including a vertically adjustable stop carried by the upper portion of the bifrucated member and positioned between the third impact absorbing member and the upper portion of the bifrucated member.

15. A hitch assembly for connecting tractor and trailer vehicles, comprising:

a first member adapted to be connected to and project rearwardly from the tractor vehicle;

a second member adapted to be connected to and project forwardly from the trailer vehicle;

a coupling member connected adjacent its opposite ends to the first and second members, respectively, the connection at one end of the coupling member allowing pivotal movement about a horizontal axis while the connection at the opposite end allows pivotal movement about a vertical axis;

a rigid lever arm extending across the horizontal axis in a plane perpendicular thereto, the arms having end portions which bear on the members on opposite sides of the horizontal axis, respectively;

means for retaining the lever arm in the vertical plane of the coupler member; and resilient means engaging the lever arm intermediate the ends thereof to dampen movement of the members about the horizontal axis.

16. A hitch assembly according to claim 15 further including means to dampen movement of the members about the vertical axis.

* * * * *

UNITED STATES PATENT OFFICE
CERTIFICATE OF CORRECTION

Patent No. 3,741,587          Dated June 26, 1973

Inventor(s) Ernest R. Willaman

It is certified that error appears in the above-identified patent and that said Letters Patent are hereby corrected as shown below:

On the cover page, the inventor's name should read --Ernest R. Willaman--.

Column 4, line 48, "incorporated' should read --incorporates--.

Signed and sealed this 8th day of January 1974.

(SEAL)
Attest:

EDWARD M. FLETCHER, JR.      RENE D. TEGTMEYER
Attesting Officer            Acting Commissioner of Patents